US012732493B2

(12) United States Patent
Schmid et al.

(10) Patent No.: US 12,732,493 B2
(45) Date of Patent: Sep. 8, 2026

(54) AI CONVERSATION DRIVEN LOGIN

(71) Applicant: Veracode, Inc., Burlington, MA (US)

(72) Inventors: Johannes Schmid, Munich (DE); René Fred Milzarek, Munich (DE)

(73) Assignee: Veracode, Inc., Burlington, MA (US)

( * ) Notice: Subject to any disclaimer, the term of this patent is extended or adjusted under 35 U.S.C. 154(b) by 0 days.

(21) Appl. No.: 18/822,601

(22) Filed: Sep. 3, 2024

(65) Prior Publication Data

US 2026/0067264 A1 Mar. 5, 2026

(51) Int. Cl.
*H04L 9/40* (2022.01)

(52) U.S. Cl.
CPC .................................... *H04L 63/08* (2013.01)

(58) Field of Classification Search
CPC ....................................................... H04L 63/08
See application file for complete search history.

(56) References Cited

U.S. PATENT DOCUMENTS 10,956,833 B1 * 3/2021 Yamane .................... G06F 8/77
2016/0080360 A1 * 3/2016 Child ...................... G06F 21/41 726/6
2019/0213116 A1 * 7/2019 Kulkarni ............. G06F 11/3684
2021/0073110 A1 3/2021 Vidal et al.

FOREIGN PATENT DOCUMENTS

CN 113765898 B 8/2023
EP 3511836 A1 7/2019

OTHER PUBLICATIONS

EP Application No. 24206231.3, Extended European Search Report mailed Apr. 9, 2025, 8 pages.
Nayak, et al., "Experimental Security Analysis of Sensitive Data Access by Browser Extensions", Proceedings of the 1st ACM Workshop on LEO Networking and Communication, ACMPUB27, New York, NY, USA, May 13, 2024 (May 13, 2024), pp. 1283-1294.

* cited by examiner

*Primary Examiner* — Nicholas P Celani
(74) *Attorney, Agent, or Firm* — Gilliam IP PLLC

(57) ABSTRACT

A login agent interacts with a foundation model(s) until successful login to an application or an assessment of a failed login can be obtained. Initially, a web page corresponding to login for a web application will be indicated to the login agent. The login agent captures interactive elements of the web page. The login agent prompts a foundation model(s) to select which of the captured interactive elements to interact with and how to interact with the selected elements. The login agent determines commands based on the response(s) and, with the commands, uses a tool to automatically interact with the web page via a browser. The login agent captures a web page resulting from the user emulated interaction and prompts the foundation model(s) to determine whether log in was successful or failed. The response from the foundation model(s) guides the login agent to either retry login or report results.

19 Claims, 5 Drawing Sheets

AI CONVERSATION DRIVEN LOGIN

BACKGROUND

The disclosure generally relates to data processing (e.g., CPC subclass G06F) and to computing arrangements based on specific computational models (e.g., CPC subclass G06N).

Rapid developments in artificial intelligence (AI) technologies have spawned numerous terms with fluid meanings. Recently, AI technologies are frequently referred to with the terms large language model (LLM), generative AI, and foundation model. Many of these technologies are based on or relate to the "Transformer" architecture.

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a "foundational model." The Center for Research on Foundation Models at the Stanford Institute for Human-Centered Artificial Intelligence used this term in an article "On the Opportunities and Risks of Foundation Models" to describe a model trained on broad data at scale that is adaptable to a wide range of downstream tasks. There has been subsequent research in similar Transformer-based sequence modeling. The architecture of a Transformer model typically is a neural network with transformer blocks/layers, which include self-attention layers, feed-forward layers, and normalization layers. The Transformer model learns context and meaning by tracking relationships in sequential data.

Some LLMs are based on the Transformer architecture. An LLM is "large" because the training parameters are typically in the billions and have been approaching a trillion parameters. AI technologies are not limited to LLMs and research and utilization of "lightweight" language models (i.e., fewer parameters than large) has grown. Language models can be pre-trained to perform general-purpose tasks or tailored to perform specific tasks. Tailoring of language models can be achieved through various techniques, such as prompt engineering and fine-tuning.

The first instances of generative models can be found in research of the 1960s and 1970s which used generative models and statistical models to generate new instances of data. Advancements in neural networks and deep learning increased the capabilities of generative AI. The introduction of generative adversarial networks (GAN), considered a foundation model, created media that was arguably original. The introduction and advancements of the Transformer architecture yielded the Generative Pre-Trained Transformer (GPT) often associated with current generative AI technology.

BRIEF DESCRIPTION OF THE DRAWINGS

Embodiments of the disclosure may be better understood by referencing the accompanying drawings.

DESCRIPTION

Figure 1:
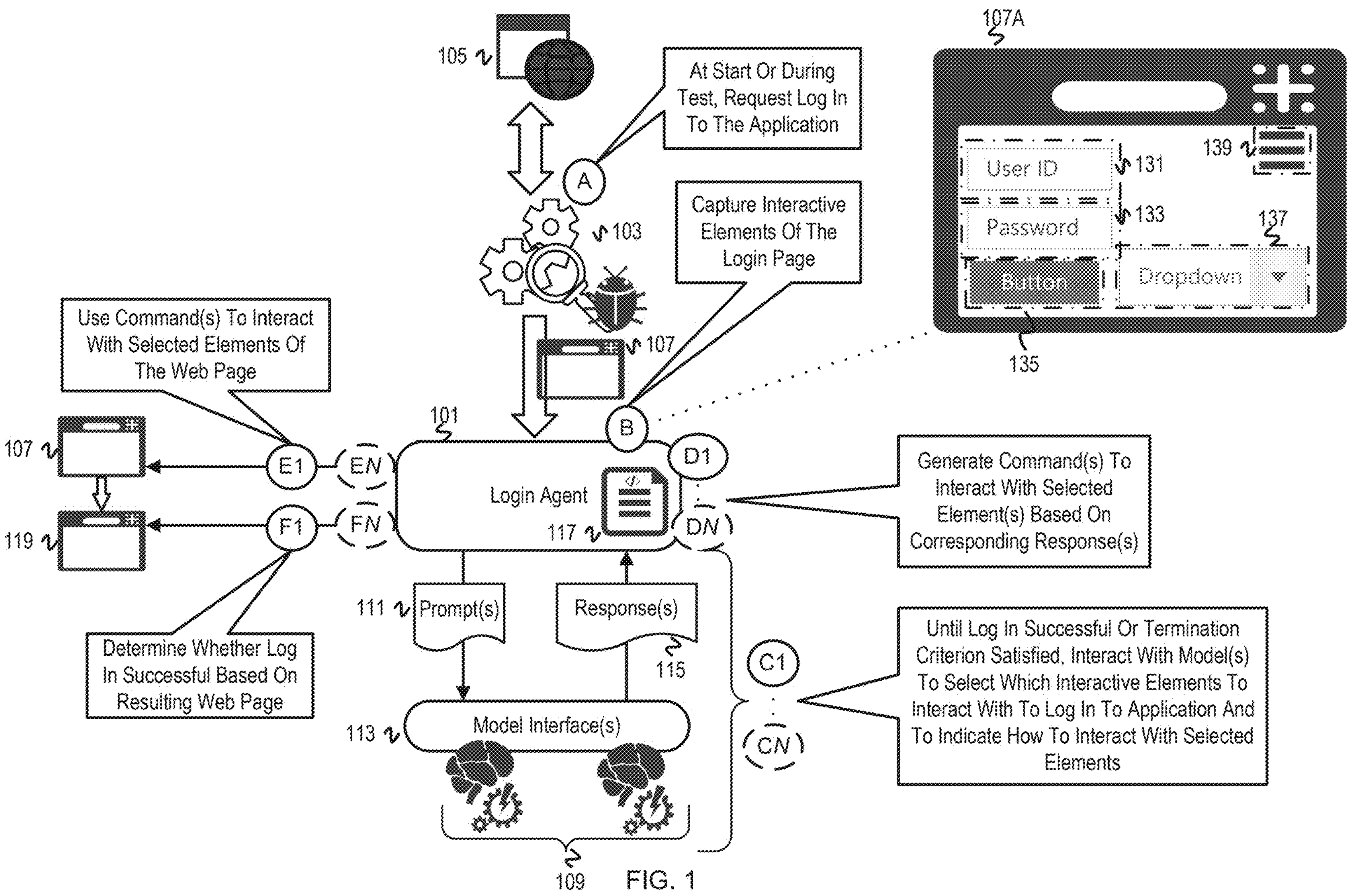
FIG. 1 is a diagram of a login agent conversing with a foundation model(s) to log in to a web application or evaluate a failed login.

The description that follows includes example systems, methods, techniques, and program flows to aid in understanding the disclosure and not to limit claim scope. Well-known instruction instances, protocols, structures, and techniques have not been shown in detail for conciseness.

Terminology

The term "log in" or "logging in" refers to interacting with a system to gain access to a system. In this disclosure, log in or logging in is used in the more specific context of interacting with a web application or a system(s) of the web application to gain access to the web application. "Login" refers to the interaction.

A "prompt" refers to input to a foundation model, and "prompting" refers to the act of submitting a prompt to a model to perform inference based on the submitted prompt. A prompt at least includes a natural language task instruction to the model. A prompt can also include context, constraints, and examples. In other words, a prompt is a natural language task instruction and other information that can assist the model in performing the task successfully. A prompt can have more than one task instruction, and prompts can be chained to incorporate responses from the model into a subsequent prompt. A prompt can be entered by a user and/or constructed from a prompt template.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Security testing a web-based application or web application includes testing log in. A tool/service that conducts application security testing of a web application (e.g., dynamic application security testing (DAST)) can automate testing with program code that relies on heuristics-based rules. The variations in login implementations across applications, however, cannot be fully addressed with heuristics-based rules. As an example, a login sequence may be interrupted by requests for information in addition to credentials (e.g., time of day, region, department, etc.). In addition to variations in login sequence, login forms can vary, such as with different presentation of fields or graphical overlays. Login implementations may include different multi-factor authentication that involves different channels of communication and/or interactions, collection of additional information for various departments and/or jurisdictions, etc.

A login agent has been created that interacts with generative AI, such as a foundation model(s), to automatically and intelligently log in to a web application. The login agent interacts or "conducts a conversation" with a foundation model(s) until successful login to the application or an assessment of a failed login can be obtained. Initially, a web page corresponding to login for a web application will be indicated to the login agent (e.g., a uniform resource locator (URL) will be provided). The login agent captures interactive elements of the web page (e.g., a field or graphical button). The login agent prompts a foundation model(s) to select which of the captured interactive elements to interact with to log in and how to interact with the selected elements. The login agent determines commands based on the response(s) and, with the commands, uses a tool (e.g., user emulator) to automatically interact with the web page via a browser. The login agent captures a web page resulting from the user emulated interaction and prompts the foundation model(s) to determine whether login in was successful or failed. The response from the foundation model(s) guides the login agent to either retry login or report results.

Example Illustrations

FIG. 1 is a diagram of a login agent conversing with a foundation model(s) to log in to a web application or evaluate a failed login. A login agent 101 interacts with one or more foundation models 109 via a model interface(s) 113, such as an application programming interface (API). For this illustration, the login agent 101 is depicted as part of an application scanner 103 that is testing a web application 105. The application scanner 103 crawls URLs of the web application 105 and tests the web application 105 for vulnerabilities, for example.

FIG. 1 is annotated with a series of letters for stages A-B, C1-CN, D1-DN, E1-EN, and F1-FN, each of which represents one or more operations. Although these stages are ordered for this example, the stages illustrate one example to aid in understanding this disclosure and should not be used to limit the claims. Subject matter falling within the scope of the claims can vary from what is illustrated.

At stage A, the application scanner 103 attempts to log in to an application being scanned or tested. An instruction or command will be given to the application scanner 103 to log in and be provided credentials for logging in. Accordingly, the application scanner 103 will request that the login agent 101 perform the login.

At stage B, the login agent 101 captures interactive elements of a login page 107. The application scanner 103 passes the credentials to the login agent 101 to carry out the requested log in. The log in agent 101 interacts with the application, for example via requests to the application programming interface (API) of the application, to capture the interactive elements. If a login page 107 is not indicated to the login agent 101, then the login agent 101 interacts with a current webpage of the application as if it was a login page. For instance, the login agent 101 captures visual elements by capturing a portion of an image ("screenshotting" or "snipping") of the rendered login page 107. Or the login agent 101 can retrieve particular objects with the API requests, such as a field to accept input or a control element that captures a click-on event. In addition, underlying code of interactive elements can be captured and associated with the visually captured interactive elements. FIG. 1 depicts an example 107A for the login page 107 to aid in illustrating the capture of interactive elements. The example login page 107A includes input fields 131, 133 to accept user ID and password credentials. The example login page 107A also includes a button 135, a dropdown menu 137, and a hamburger icon 139. Due to space constraints, only example interactive elements are depicted in the example login page 107A. FIG. 1 depicts each of the interactive elements 131, 133, 135, 137, 139 circumscribed with a dash and dot rectangle to represent screen capture of each of these interactive elements. Each captured interactive element will be saved as an image file to be incorporated into a multimodal prompt. Furthermore, login agent 107 associates the underlying metadata and source code of each of the captured interactive elements 131, 133, 135, 137, 139. Referring to the button element 135, login agent 107 extracts (e.g., copies) code and/or metadata indicating that an onClick event submits credentials entered into the field elements 131, 133. Referring to the dropdown menu 137, the login agent 107 extracts metadata and/or code indicating that the dropdown menu presents different regions for selection to determine an identity service provider URL. Associating the extracted code and/or metadata can be with an in-memory data structure, tagging, etc. The association is used in the prompt construction discussed later.

At stage C1, the login agent 101 interacts with the foundation model(s) 109 to determine how to interact with the login page 107 to log in to the web application 105. The login agent 101 interacts with the foundation model(s) 109 by prompting the foundation model(s) 109 to select which of the interactive elements to interact with to log in and how to interact with the selected elements. To interact, the login agent 101 constructs a prompt(s) 111. The login agent 101 constructs the prompt(s) 111 based on a prompt template or configuration file that includes natural language instructions that define a task(s) to be performed by the foundation model(s) 109. In this case, the task instruction is to determine how to interact with the login page 107 to log in to the application 105. The task instruction directs a foundation model to select which of the captured interactive elements to interact with to log in and explain how to interact with the elements. Construction of the prompt includes inserting the captured images and corresponding code and/or metadata to provide more context for the images. Instructing a foundation model to explain how to interact with selected elements can specify that the foundation model is to describe the element in addition to how to interact with that element. After the prompt is constructed, the login agent 107 submits the prompt(s) 111 to the foundation model(s) 109 via the model interface(s) 113. For instance, the login agent 101 populates an application programming interface (API) call with the prompt and executes the API call. The foundation model(s) 109 then return a response(s) 115 to the login agent 101.

At stage D1, the login agent 101 generates a command(s) based on the response(s) 115. The login agent 101 utilizes a tool that emulates user interaction with a browser. The login agent 107 processes the response(s) 115 that selects which of the interactive elements to interact with to log in to the web application 105. The login agent 101 also processes the response(s) 115 to determine, for each selected interactive element, a command(s) and argument(s) for the tool run to implement the action described in the response(s) 115. For instance, the response 115 can state that the credential should be entered into the fields 131, 133 and the button 135 clicked on. The login agent 101 would select the command of the tool that would enter text and provide as arguments an identifier of the fields 131, 133 and corresponding credentials. The response(s) 115 may state that log in does not include any interaction with the hamburger icon 139 or this can be implied by absence of mention of the element 139.

At stage E1, the login agent 101 uses the command(s) to interact with the selected elements of the web page 107. The login agent 101 runs the generated command(s) with the emulator tool to interact with the web page 107. The result of the interaction is loading of a web page 119 ("the resulting web page").

At stage F1, the login agent 101 determines whether login was successful based on the resulting web page 119. The login agent 101 interacts with the foundation model(s) 109 to determine whether login was successful. This is explored in more detail in the flowcharts.

The login agent 101 may continue attempting to log in if the browser interaction failed to log in to the application 105, or may present information about the interactions and results if login was successful or a termination criterion was satisfied if one is defined. If the login agent 101 determines that the interaction failed to login, the login agent 101 repeats the operations, which is represented by CN, DN, EN, FN. However, prompt construction in the context of these operations includes adding the resulting web page or information about the resulting web page and previous interactions/actions to the task context in the prompt. If a termination criterion is defined (e.g., threshold number of attempts), the login agent 101 terminates the log in attempts. If login was successful, then the login agent 101 can record or communicate the successful interaction as well as any previous failed interactions.

Figure 2:
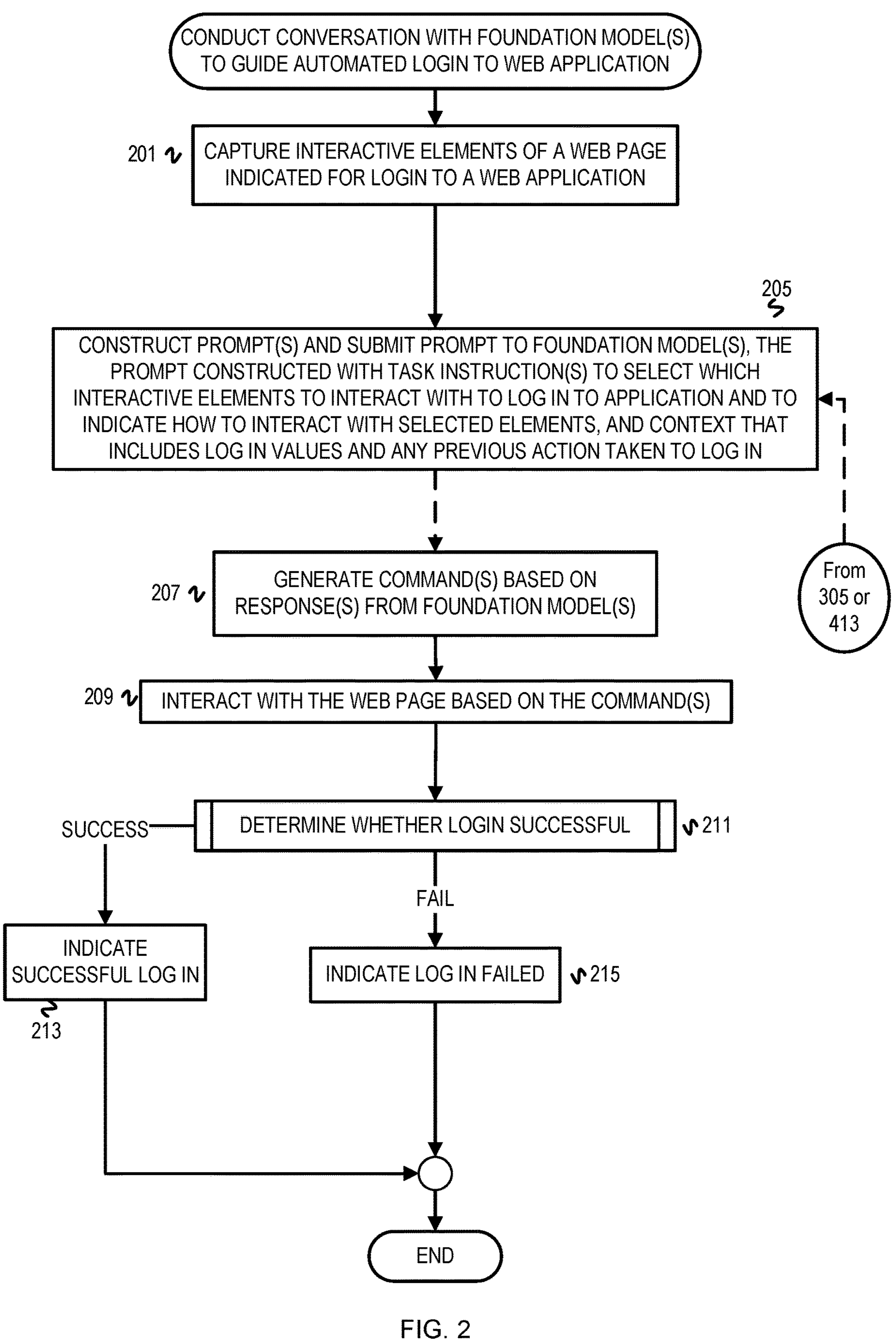
FIG. 2 is a flowchart of example operations for conducting a conversation with a foundation model(s) to guide automated log in to a web application.
Figure 3:
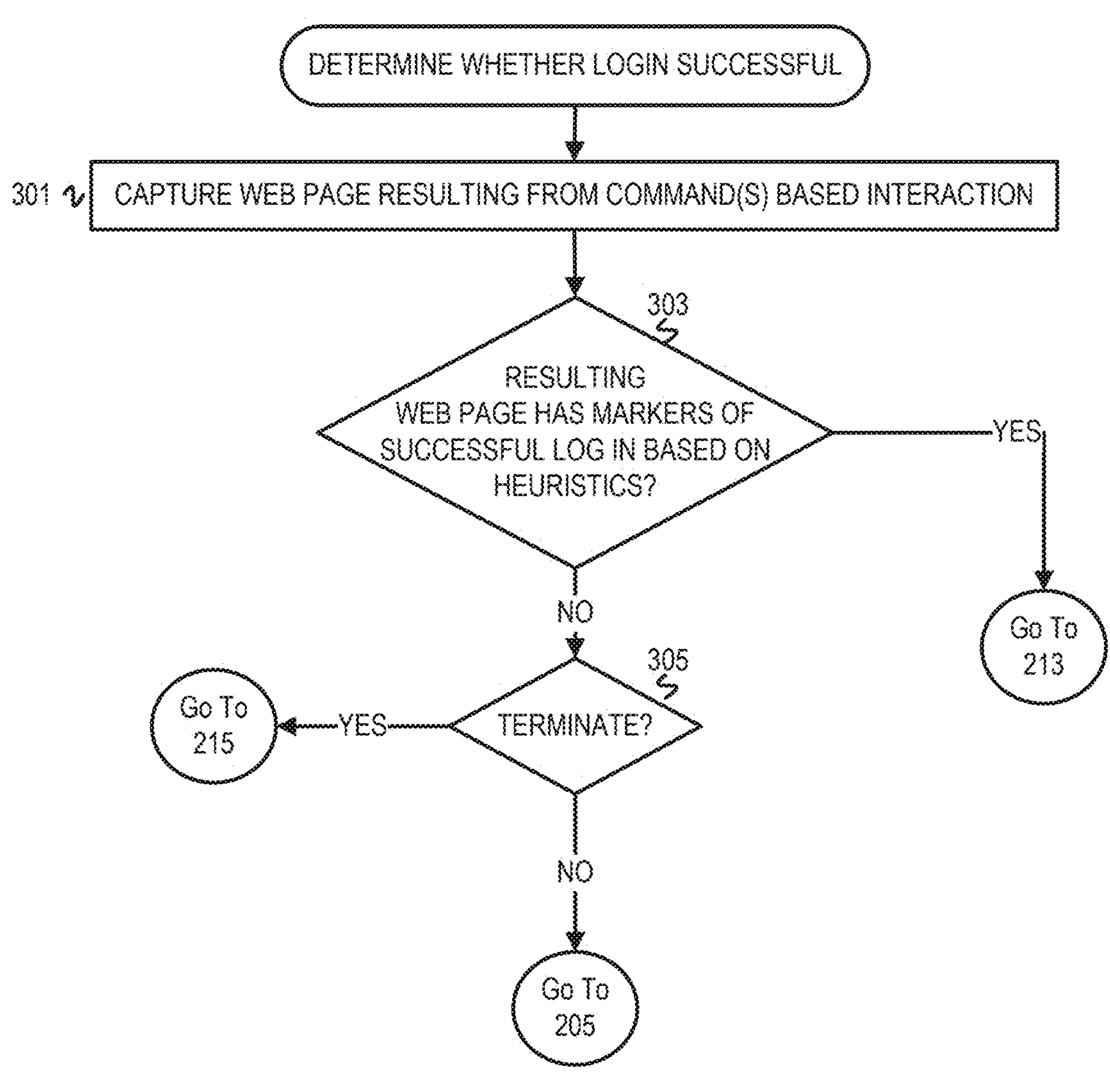
FIG. 3 is a flowchart of example operations for determining whether a login was successful.
Figure 4:
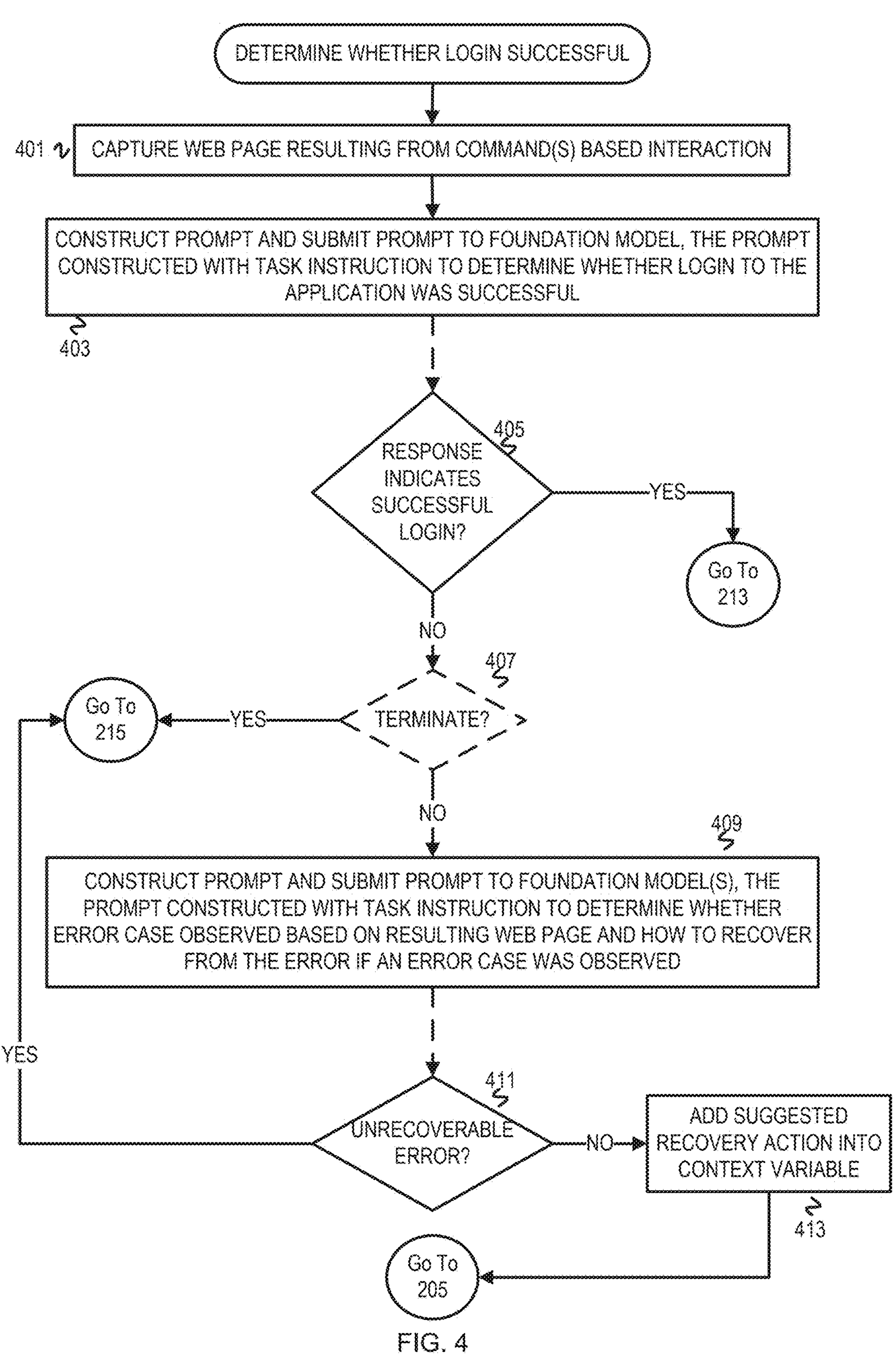
FIG. 4 is a flowchart of example operations for determining whether a login was successful.

FIGS. 2-4 are flowcharts of example operations that explore some variations in implementations of the disclosed technology, as well as providing a description that is more generalized than the specific example illustrated in FIG. 1. The example operations are described with reference to a login agent for consistency with FIG. 1 and ease of understanding. The name chosen for program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. Dashed lines in the flowcharts are used to represent the login agent awaiting a reply from a foundation model.

FIG. 2 is a flowchart of example operations for conducting a conversation with a foundation model(s) to guide automated log in to a web application. The flowchart presumes that a web page has already been indicated to the login agent, whether as part of application security testing or a different purpose, such as quality assurance. The web page may be indicated as a URL or already loaded into a browser or browser emulator.

At block 201, the login agent captures interactive elements of a web page indicated for login to a web application. The login agent examines the source code of the web page as rendered, which can include modifications from scripts, to identify elements that are interactive. For instance, the login agent examines an object model tree resulting from the mergers of a document object model (DOM) and a cascading style sheet object model (CSSOM). The login agent can identify the interactive elements based on tags or keywords in the source code that likely indicate an interactive element. Examples of these keywords include input type, onClick, login, form, and submit. The login agent can identify interactive elements from less explicit indicators in the rendered code of the webpage. For instance, the login agent examines the webpage code for indications of registered listeners (e.g., examine an object model node for listener registration of an element or object). The login agent then captures the renderings of these interactive elements or visual interactive elements. For instance, the login agent captures a screenshot of a portion of a display with the rendering of the web page based on names of interactive elements detected in the source code (e.g., button captions or field names). The login agent can store the captured interactive visual elements with the underlying source code used to identify the interactive visual elements.

At block 205, the login agent constructs a multimodal prompt(s) and submits the prompt(s) to a foundation model(s). The prompt is constructed with task instruction(s) to select which interactive elements to interact with to log in to the application and to indicate how to interact with selected elements and context that includes log in values and any previous action taken to log in. The login agent can use a prompt template that includes a task instruction for a foundation model to select which of the captured interactive elements to interact with to log in to an application and how to interact. An example prompt template is below that accepts as arguments a URL (current_URL), user context (user_context), and previous actions (previous_actions) and uses a placeholder or variable for the action(s) recommended by the foundation model.

" ""Your goal is to log in to an application. If you have already attempted to log in to the application, you have yet to successfully log in to the application. You are provided a list of interactive elements of a web page. Your task is to analyze the list of interactive elements and select which element or elements to interact with to log in to the application. To perform this task you will:

1) Identify a Login Form.
2) Fill in the login form and any subsequent form to complete login based on the information provided in the user context.

The URL of the web page for initial interaction is: {current_URL}

The user context is: {user_context}

Previous actions you have performed that did not successfully login: {previous_actions}

Conform your answer to the following format.

-----------------

Recommended Action: Explain the action to take to interact with a selected element and identify the element with the identifier associated with the element in the list. Describe the action along with which value, if any, to provide for the action.

-----------------

List of elements: {elementlist}

" """

The login agent will assign the URL indicated to the login agent to current_URL. To illustrate a change in the URL for log in, a first URL may have been to a webpage that only accepted a user identifier. A next URL would direct to a webpage that accepts a password. The login agent will assign to elementlist the list of captured interactive elements, each paired with any extracted metadata and/or code of the interactive element. The login agent assigns to user_context credentials or any other information provided to the login agent for log in. The credentials and any other login information can be in a configuration file or data file loaded into the login agent or at a location accessible by the login agent. These can be structured as key-value pairs, for instance in a Javascript® Object Notation object. Initially, the variable previous_actions will be an empty string. As the login agent retries logging in to the application, the log in agent will update previous_actions with the actions recommended for the preceding login attempt. This can be considered part of the task context and guide the foundation model from repeating unsuccessful interactions. The prompt can also include constraints, such as instructing the model to not create an account or change a password. In addition, task instructions can be submitted over multiple prompts and/or to different foundation models. For example, the login agent can create one prompt with a task instruction to select from the list of interactive elements which of the interactive elements to interact with to log in to an application. The login agent can then create another prompt that incorporates the selected interactive elements and specifies a task instruction for the model to explain how to interact with the selected task elements. The task instruction that directs the model to explain how to interact can be a task instruction to describe the selected interactive elements and format the description according to a specified structure (e.g., key-value pairs of interactive element name and description). The login agent can submit these different prompts to the same foundation model or different foundation models. In addition, the login agent can construct the prompt(s) according to one or few shot prompting (i.e., providing an example response).

At block 207, the login agent generates a command(s) based on the response(s) from the foundation model(s). The login agent processes the response from the foundation model(s) that indicates how to interact with each selected interactive element. The login agent can determine a command corresponding to a described action based on semantic similarity or keywords. For instance, the login agent can parse a response that states "enter the user email address into the user identifier field and the password into the password field" and select from a set of commands available for a user emulator tool for browser interaction. For example, the login agent maps the above response to commands find_element_by_id( . . . ).sendKeys( . . . ) and find_element_by_name( . . . ).sendKeys( . . . ).

The login agent identifies the interactive element corresponding to the "user identifier field" and determines an identifier or name which guides selection and population of the appropriate command. Alternatively, the login agent can prompt a foundation model to generate the command(s). For example, the login agent can construct a prompt with a task instruction to determine the command(s) to effectuate the action(s) described in the previously received response and submit the command to a code generation foundation model, the same foundation model that generated the previous response, or a different foundation model that is not necessarily a code generation model. Below is an example prompt to instruct a foundation model to generate the command(s).

```
" """
Your task is to fully authenticate against the application
  related to the HTML target. To fully authenticate, select
  one or more commands from the list of allowed com-
  mands and populate with appropriate values from user
  context. Selection of the one or more commands is
  based on the specified action to take.
Allowed Commands
find_element_by_xpath( . . . ).click( )
find_element_by_xpath( . . . ).sendKeys( . . . )
find_element_by_xpath( . . . ).selectByValue( . . . )
find_element_by_id( . . . ).click( )
find_element_by_id( . . . ).sendKeys( . . . )
find_element_by_id( . . . ).selectByValue( . . . )
find_element_by_name( . . . ).click( )
find_element_by_name( . . . ).sendKeys( . . . )
find_element_by_name( . . . ).selectByValue( . . . )
User context (key:value pairs): {context_input}
HTML target: {HTML_target}
Action to take: {recommended_action}
" """
```

To construct the prompt, the login agent extracts the actions recommended in the preceding response and populates the variable recommended action with the extracted action(s). For HTML_target, the login agent inserts the HTML from the web page indicated for log in. The login agent may clean the HTML beforehand, such as invoke a cleaner to remove empty paragraphs and normalize tags and formatting. Additional examples of cleaning the HTML include cleaning style attributes, attributes set or added by scripts, HTML comments, single vector graphics (SVG) tags, and script tags. The prompt can also include constraints that direct a foundation model to not use variables.

At block 209, the login agent interacts with the web page based on the command(s). The login agent runs the generated command(s) with the user emulation tool for browser interaction.

At block 211, the login agent determines whether login was successful. This determination can be implemented differently depending on whether a cycle threshold is imposed, a foundation model is used to evaluate, etc. FIGS. 3 and 4 provide example operations that elaborate on this determination. If login was successful, then operational flow proceeds to block 213. If not successful, then operational flow proceeds to block 215.

At block 213, the login agent indicates successful log in. The login agent can generate a report with an explanation of how successful login was achieved and preceding failed attempts. This report of successful login with explanation can be stored and later followed for subsequent log in to the application. For example, the commands that lead to successful log in can be stored for performing by a user emulator without trial and error. Alternatively, the login agent can return a value that indicates success or return the URL or screen capture of the web page resulting from the successful login.

At block 215, the login agent indicates that the log in failed. Depending upon implementation, this can be an explanation of the various interactions and/or the URL or screen capture of the resulting web page. As another example, the login agent can simply return a value indicating failed login.

FIG. 3 is a flowchart of example operations for determining whether a login was successful. The example operations of FIG. 3 correspond to an implementation that relies on heuristics about a resulting web page to determine whether login was successful.

At block 301, the login agent captures the web page resulting from the command(s) based interaction. After the login agent runs the command(s) with the user emulation tool for browser interaction, the login agent captures a screenshot of the resulting web page.

At block 303, the login agent determines whether the resulting web page has markers of successful login based on defined heuristics. Conditions or rules based on heuristics can specify markers (e.g., keywords and/or graphic elements) that collectively correlate to a web page that would result from a successful login. For example, the heuristics based conditions/rules can specify markers that correlate to a section of a webpage (e.g., a dashboard) or correlate to a landing page likely presented after a successful login. Examples of markers that indicate successful login include a path occurring in the URL (e.g., a path that includes "dashboard" or "home"), an element identifier in the underlying code that indicates a value often associated with successful login, and a key-value pair in a cookie that often appears after successful login (e.g., a session token value). If the login agent determines that login was successful, the operational flow proceeds to block 213 of FIG. 2. If the login agent determines that login was not successful, then operational flow proceeds to block 305.

At block 305, the login agent determines whether to terminate the conversation or login attempt cycle. Implementations may limit the number of cycles to repeat interactions for various reasons (e.g., heuristics-based threshold indicating declining likelihood of success or conservation of tokens expended on a foundation model). Additional examples include detection of issues connecting with the application (e.g., network connection issues), a blank web page that does not provide elements or information to assess, and an error with the login agent itself. If the login agent determines that the conversation should be terminated, then operational flow proceeds to block 215 of FIG. 2. Otherwise, operational flow proceeds to block 205 of FIG. 2.

FIG. 4 is a flowchart of example operations for determining whether a login was successful. The example operations of FIG. 4 correspond to an implementation that leverages foundation model reasoning to determine whether login was successful.

At block 401, the login agent captures the web page resulting from the command(s) based interaction. After the login agent runs the command(s) with the user emulation tool for browser interaction, the login agent captures a screenshot of the resulting web page.

At block 403, the login agent constructs a multimodal prompt and submits the prompt to a foundation model to obtain an evaluation of the resulting web page. The login agent constructs the prompt with a task instruction to determine whether login to the application was successful based on the capture of the resulting web page. As an example, the task instruction can be for the foundation model to describe the resulting web page as represented by the screenshot image of the resulting web page and then determine, based on the description, whether login was successful.

At block 405, the login agent determines whether the response from the foundation model indicates a successful login. Assuming the format specified in the above example prompt, the response can be a Yes or No response to whether the login was successful paired with an explanation for the answer. If the login agent determines that the response indicates the login was successful, then operational flow proceeds to block 213 of FIG. 2. Otherwise, operational flow proceeds to block 407.

At block 407, the login agent determines whether to terminate the conversation/login attempt cycle. This is similar to the example operation of block 305 in FIG. 3 but is depicted as optional in FIG. 4 as represented by the dashed line. The operation is presented as optional since an unsuccessful login can be addressed by tasking the foundation model with determining whether a resulting web page indicates an unrecoverable error (409). Examples of an unrecoverable error or state include the application presenting a maintenance page or an anti-automation system intervening (e.g. a captcha challenge). If the login agent determines that the conversation should be terminated, then operational flow proceeds to block 215 of FIG. 2. If the login agent determines that the conversation should not be terminated or the operation of block 407 is not performed, operational flow proceeds to block 409.

At block 409, the login agent constructs a prompt and submits the prompt to the foundation model to obtain a response that evaluates whether the failed login attempt is a recoverable error. An example of a recoverable error or state is that a field was filled incorrectly. The login agent constructs the prompt with a task instruction that instructs the foundation model to determine whether an error case is observed based on the screenshot of the resulting web page. The prompt can also include a task instruction that instructs the model to determine whether the observed error is recoverable (i.e., whether the login can be attempted with a different action(s)) and instructing the model to explain how to recover from the error if an error case was observed. The login agent constructs the prompt to also include the previous actions (previous_actions) to provide context for the foundation model.

At block 411, the login agent processes the response from the foundation model to determine whether an unrecoverable error was detected based on the response from the foundation model. Depending on the specificity of the prompt, the foundation model response may state that the resulting web page corresponds to an unrecoverable error. Or the login agent can determine that the response indicates an unrecoverable error if the response states that an error case is observed but has not recommended action to recover from the error. If an unrecoverable error was detected, then the explanation in the response is recorded for conveyance with indication of failed login in block 215. If no error or a recoverable error was detected, then operational flow proceeds to block 413.

At block 413, the login agent adds the explanation of the suggested recovery action and explanation of the error from the foundation model response into a context variable. This can be a separate context variable that is used to construct the prompt in block 205 or the information can be included in previous_actions. Operational flow continues from block 413 to block 205.

Variations

The example illustrations describe various context to provide to a foundation model to determine whether successful login has been achieved, such as the resulting URL and elements of the resulting web page. Information outside of the URL and web page can also aid in determining whether login was successful. For instance, network traffic or HTTP messages can be captured as additional context. Values of header fields can be extracted and provided to aid in the determination of whether login was successful.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
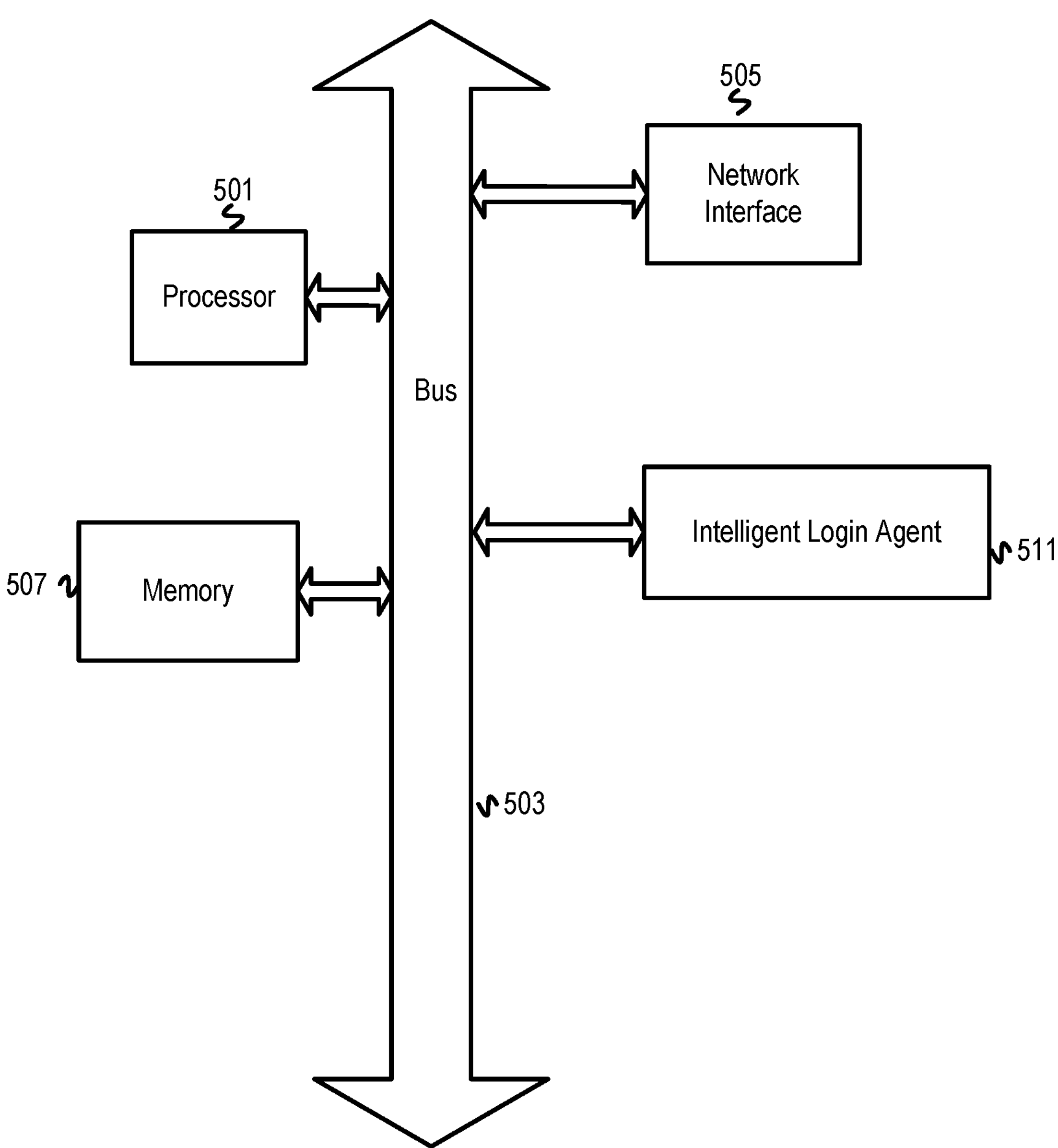
FIG. 5 depicts an example computer system with an intelligent login agent.

FIG. 5 depicts an example computer system with an intelligent login agent. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes an intelligent login agent 511. The intelligent login agent 511 gains intelligence from one or more foundation models that provide recommended actions for login to an application. After a web page for an application is indicated, the intelligent login agent 511 captures visual interactive elements of the web page. The intelligent login agent 511 also examines the underlying code of the interactive elements to obtain additional information, such as element identifiers and action names associated with the captured elements. The intelligent login agent 511 gathers the captured interactive elements together with additional information and repeatedly prompts a foundation model(s) to obtain a description of how to interact with the web page with respect to the captured interactive elements to log in to the application. Initially, the login agent gathers together the captured interactive elements and additional information for context and a prompt template that includes a task instruction requesting a foundation model to select which elements to interact with and how to interact with the selected element(s) to log in to the application. The task instruction requesting how to interact can be a task instruction requesting recommended actions and/or a task instruction requesting a description of the elements. The intelligent login agent 511 then generates a command(s) to be run with a user emulation tool for browser interaction to interact with the web page. Generation of the commands can be based on heuristics that select from a limited set of commands and populate those commands based on the response from the foundation model or involve prompting the foundation model or another model (e.g., a code generation model) to generate the command(s) with the previous model answer as context. The intelligent login agent 511 examines the resulting web page, based on heuristics or with foundation model prompting, to determine whether login was successful or login failed and to continue attempting login. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:

repeatedly interacting with a set of one or more artificial intelligence (AI) models until log in to an application is successful or a testing termination criterion is satisfied, wherein interacting with the set of one or more AI models comprises, capturing renderings and underlying code a first set of one or more interactive elements of a current web page indicated for login to the application;

constructing a multimodal prompt with the captured renderings and underlying code of the current web page, context indicating one or more previous login attempts and values, and a prompt template having task instructions to identify which of the one or more interactive elements to interact with to log in to the application and to indicate how to interact with the one or more interactive elements;

prompting the set of one or more AI models with the multimodal prompt;

generating a first set of one or more commands for a user emulator tool to interact with the first web page based on one or more responses to the prompting;

running the set of one or more commands with the user emulator tool to interact with the current web page;

capturing a web page resulting from the interaction with the first-current web page; and evaluating the resulting web page to determine whether login to the application was successful or failed.

2. The method of claim 1, wherein constructing the multimodal prompt also with a uniform resource locator specified for login to the application and provided credentials, wherein the values comprise the provided credentials.

3. The method of claim 1 further comprising, if it is determined that the testing termination criterion is satisfied, prompting the set of one or more AI models to examine a most recent resulting web page and provide a reason for at least a most recent failed login.

4. The method of claim 1, wherein the prompt template includes one or more natural language task instructions to identify a log in form and fill in the log in form for successful log in to the application.

5. The method of claim 1, wherein running the set of one or more commands with the user emulator tool comprises executing the set of one or more commands with the user emulator tool that simulates user interaction with a web page via a web browser.

6. The method of claim 1, further comprising identifying which elements of the current web page are interactive elements.

7. The method of claim 1, wherein evaluating the resulting web page to determine whether log in to the application was successful or failed comprises prompting a first of the set of AI models to determine whether login was successful or failed.

8. The method of claim 6, wherein identifying which elements are interactive elements comprises prompting the first-set of AI models to generate a structured description of the elements.

9. A non-transitory, machine-readable medium having program code stored thereon, the program code comprising instructions to:

repeatedly interact with a set of one or more foundation models until log in to an application until successful login or a termination criterion is satisfied, wherein the instructions to interact with the set of one or more foundation models comprise instructions to, capture renderings and underlying code of one or more interactive elements of a current web page indicated for log in to the application;

construct a multimodal prompt with the captured renderings and underlying code of the current web page, context indicating one or more previous login attempts and values, and a prompt template having task instructions to identify which of the one or more interactive elements to interact with to log in to the application and to indicate how to interact with the one or more interactive elements;

prompt the set of one or more foundation models with the multimodal prompt;

generate a first set of one or more commands for a user emulator tool to interact with the current web page based on one or more responses to the prompting;

run the first set of commands with the user emulator tool on the current web page;

capture a web page resulting from the interaction with the current web page; and evaluate the resulting web page to determine whether login to the application was successful.

10. The non-transitory, machine-readable medium of claim 9, wherein the instructions to construct the multimodal prompt is also with a uniform resource locator of the current web page and provided credentials, wherein the values comprise the provided credentials.

11. The non-transitory, machine-readable medium of claim 9, wherein the program code further comprises instructions to prompt the set of one or more foundation models to examine a most recent resulting web page and provide a reason for at least a most recent failed login, wherein the termination criterion is satisfied if a response to the prompt indicates that the most recent resulting web page indicates an unrecoverable error.

12. The non-transitory, machine-readable medium of claim 9, wherein the instructions to evaluate the resulting web page to determine whether login to the application was successful comprise instructions to prompt the set of one or more foundation models to determine whether login was successful based on a screenshot of the resulting web page.

13. The non-transitory, machine-readable medium of claim 9, wherein task instructions comprise a task instruction to generate a structured description of the interactive elements.

14. An apparatus comprising:

a processor; and a machine-readable medium having instructions stored thereon that are executable by the processor to cause the apparatus to, repeatedly interact with a set of one or more foundation models to log in to an application until successful login or a termination criterion is satisfied, wherein the instructions to interact with the set of one or more foundation models comprise instructions to, capture renderings and underlying code of one or more interactive elements of a current web page indicated for log in to the application;

construct a multimodal prompt with the captured renderings and underlying code of the current web page, context indicating one or more previous login attempts and values, and a prompt template having task instructions to identify which of the one or more interactive elements to interact with to log in to the application and to indicate how to interact with the one or more interactive elements;

prompt the set of one or more foundation models with the multimodal prompt;

generate a first set of one or more commands for a user emulator tool to interact with the current web page based on one or more responses to the prompting;

run the first set of commands with the user emulator tool on the current web page;

capture a web page resulting from the interaction with the current web page; and evaluate the resulting web page to determine whether login to the application was successful.

15. The method of claim 1, wherein generating the first set of one or more commands comprises, for each login cycle, parsing the one or more responses from the set of AI models into one or more described actions and mapping each described action to one of a plurality of commands based on semantic similarities between the described action and names or descriptions of the plurality of commands.

16. The method of claim 1, wherein generating the first set of one or more commands comprises, for each login cycle, prompting the set of AI models to select from a plurality of commands for the user emulator tool based on the one or more responses and to populate the selected commands based on the one or more responses.

17. The non-transitory, machine-readable medium of claim 9, wherein the instructions to generate the first set of one or more commands comprise instructions to, for each login cycle, parse the one or more responses from the set of AI models into one or more described actions and map each described action to one of a plurality of commands based on semantic similarities between the described action and names or descriptions of the plurality of commands.

18. The apparatus of claim 14, wherein the instructions to generate the first set of one or more commands comprise instructions executable by the processor to cause the apparatus to, for each login cycle, parse the one or more responses from the set of AI models into one or more described actions and map each described action to one of a plurality of commands based on semantic similarities between the described action and names or descriptions of the plurality of commands.

19. The apparatus of claim 14, wherein the machine-readable medium further has stored thereon instructions executable by the processor to cause the apparatus to prompt the set of one or more foundation models to examine a most recent resulting web page and provide a reason for at least a most recent failed login, wherein the termination criterion is satisfied if a response to the prompt indicates that the most recent resulting web page indicates an unrecoverable error.

* * * * *